United States Patent [19]

Nakamura et al.

[11] Patent Number: 5,467,521
[45] Date of Patent: Nov. 21, 1995

[54] METHOD OF PRODUCING SQUIRREL-CAGE ROTOR FOR INDUCTION MOTOR

[75] Inventors: Kosei Nakamura, Yamanashi; Yoshiyuki Hayashi, Shizuoka; Masami Kimijima; Yohei Arimatsu, both of Yamanashi, all of Japan

[73] Assignee: Fanuc Ltd., Yamanashi, Japan

[21] Appl. No.: 318,681

[22] PCT Filed: Feb. 18, 1994

[86] PCT No.: PCT/JP94/00253

§ 371 Date: Oct. 17, 1994

§ 102(e) Date: Oct. 17, 1994

[87] PCT Pub. No.: WO94/19857

PCT Pub. Date: Jan. 9, 1994

[30] Foreign Application Priority Data

Feb. 18, 1993 [JP] Japan .................................. 5-029129

[51] Int. Cl.⁶ .................................................. H02K 15/14
[52] U.S. Cl. ................... 29/598; 164/109; 164/DIG. 10; 310/211
[58] Field of Search .............................. 29/598; 164/109, 164/DIG. 10; 310/42, 211, 212

[56] References Cited

FOREIGN PATENT DOCUMENTS 62-100152  5/0987  Japan .
54-142410  10/1979  Japan .
58-224548  12/1983  Japan .

Primary Examiner—Carl E. Hall
Attorney, Agent, or Firm—Nikaido, Marmelstein, Murray & Oram

[57] ABSTRACT

A method of producing a squirrel-cage rotor for an induction motor, which includes a plurality of secondary conductors arranged respectively in through holes (16) of a laminated core (14), and a pair of end rings connecting the secondary conductors with one another at both axial ends of the laminated core (14). Each of a pair of reinforcing members (22) includes a cylindrical wall (26), an annular multi-aperture wall (28) provided with apertures (32) and extending in a radial inward direction from one edge of the cylindrical wall (26), and an annular end wall (30) extending generally parallel to the multi-aperture wall (28) in a radial inward direction from another edge of the cylindrical wall (26). Each reinforcing member (22) is arranged in a manner in which the multi-aperture wall (28) is brought into contact with one of the axial end faces of the laminated core (14) while the apertures (32) communicate with the through holes (16). In this state, the laminated core (14) and the pair of reinforcing members (22) are fixedly supported by a jig (34) and placed in a mold (36). In the casting process, molten metal is poured into a continuous cavity from a center opening (31) of the end wall (30) of one reinforcing member (22a) disposed near a gate (58), while gas in the cavity is discharged through a center opening (31) of the end wall (30) of another reinforcing member (22b).

4 Claims, 4 Drawing Sheets

METHOD OF PRODUCING SQUIRREL-CAGE ROTOR FOR INDUCTION MOTOR

TECHNICAL FIELD

The present invention relates to a method of producing a squirrel-cage rotor for an induction motor, and more particularly to a method of producing a squirrel-cage rotor for a high-speed induction motor, which includes reinforcing members for preventing end rings made by a casting from being deformed during high-speed rotation.

BACKGROUND ART

Some induction motors, used as, e.g., spindle motors for machine tools, have squirrel-cage rotors which include secondary conductors and end rings both integrally formed with a laminated core by a casting process. When the speed of an induction motor having such a squirrel-cage rotor must be increased, there is the concern that the end rings arranged at the axial ends of a laminated core may bend or break due to the centrifugal force caused by high-speed rotation. A known squirrel-cage rotor adaptable to high-speed rotation includes separate reinforcing members formed of high-rigidity materials, such as iron or stainless steel, the reinforcing members being fixedly disposed on the rotor while surrounding the end rings, so as to eliminate the deformation of the end rings.

Conventional reinforcing members for the end rings of a high-speed squirrel-cage rotor are formed as annular elements, each of which has a generally L-shaped cross-section at a circumferential region and includes a cylindrical wall coming into contact with the cylindrical radial outer circumferential surface of the end ring and an end wall coming into contact with the axial end surface of the end ring. The reinforcing member covers the outer surface of the end ring, and the end wall thereof is usually fixed to the axial end surface of the end ring by fixing means such as bolts. Therefore, deformation of the end ring due to centrifugal force is prevented by the cylindrical wall of the reinforcing member. In such a construction, however, the cylindrical wall is supported through the end wall on the end ring in a cantilever manner, which causes the problem that the cylindrical wall tends in itself to be bent outward due to centrifugal force in response to the increase of the diameter of the rotor or the rotation speed thereof, and thus fails to support the end ring.

The applicant of the present invention provided in the International Patent Application No. PCT/JP93/01335 (co-pending application), as a related art for solving the above problems, a squirrel-cage rotor comprising reinforcing members, each of which includes a cylindrical wall for surrounding a cylindrical outer surface of each end ring, a multi-aperture wall provided with a plurality of apertures which communicate respectively with the through holes of the laminated core for secondary conductors and extending in a radial inward direction from one edge of the cylindrical wall so as to be held between the end ring and an axial end face of the laminated core, and an end wall extending in a radial inward direction from the other edge of the cylindrical wall so as to come into contact with an axial outer surface of the end ring at a side opposite to the multi-aperture wall. In the casting process of this squirrel-cage rotor, a pair of reinforcing members is first disposed at and brought into contact with the axial end faces of the laminated core so that the apertures of the multi-aperture walls of the reinforcing members respectively communicate with the through holes of the laminated core. In this state, the laminated core and the reinforcing members are supported by a jig. Then, the laminated core and reinforcing members supported by the jig are placed in a mold, and molten metal is poured into a center opening of the end wall of one reinforcing member, so as to cast a plurality of secondary conductors and a pair of end rings. In this manner, the reinforcing members are fixedly held by the end rings and the laminated core, and the cylindrical walls of the reinforcing members are firmly supported at both ends thereof through the multi-aperture walls and the end walls, and thus the reinforcing members themselves are prevented from being deformed.

In the casting process of the reinforcing members for end rings according to the above related art, it is required to smoothly discharge air from a casting cavity in order to stabilize the flow of molten metal and to improve the quality of the casting. To this end, it may be proposed that a plurality of air vent holes can be provided in the other reinforcing member which is located opposite to a gate. However, from the viewpoint of ensuring the strength of the reinforcing member, it is preferred that the air vent holes are not provided in the reinforcing member.

DISCLOSURE OF THE INVENTION

The object of the present invention is to provide a method of producing a squirrel-cage rotor for an induction motor, which can carry out a high quality casting of secondary conductors and end rings while maintaining the strength of the reinforcing members used for preventing the end rings from being deformed or broken upon high-speed rotation.

To accomplish the above object, the present invention provides a method of producing a squirrel-cage rotor for an induction motor, which includes a laminated core coaxially fixed to a shaft and having axially extending through holes near and outer circumferential surface, a plurality of secondary conductors arranged respectively in the through holes of the laminated core, and a pair of end rings connecting the secondary conductors with one another at both axial ends of the laminated core, comprising the steps of:

a) providing a pair of reinforcing members, each of which includes an axially extending cylindrical wall having an outer diameter being generally the same as an outer diameter of the laminated core, an annular multi-aperture wall provided with apertures which can communicate respectively with the through holes of the laminated core and extending in a radial inward direction from one edge of the cylindrical wall, and an annular end wall spaced generally parallel to the multi-aperture wall and extending in a radial inward direction from another edge of the cylindrical wall;

b) arranging each reinforcing member in a manner in which the multi-aperture wall is brought into contact with one of the axial end faces of the laminated core while the apertures communicate with the through holes, and, in this state, fixedly supporting the laminated core and the pair of reinforcing members by a jig;

c) placing the laminated core and the pair of reinforcing members supported by the jig in a mold;

d) pouring molten metal into a continuous cavity from a center opening of the end wall of one reinforcing member while discharging gas in the cavity from a center opening of the end wall of another reinforcing member, the cavity being defined in the mold by annular spaces each being surrounded by the cylindrical wall, the multi-aperture wall and the end wall of each reinforcing member, the apertures of the multi-aperture wall of each reinforcing member, and the through holes of the laminated core;

e) setting the molten metal in the cavity, whereby integrally forming the secondary conductors and the pair of end rings in a manner in which the multi-aperture wall of each reinforcing member is held between an axial end face of the laminated core and each end ring, and in which the cylindrical wall and the end wall of each reinforcing member cover a surface of each end ring; and f) removing the laminated core and the reinforcing members, which have the secondary conductors and the pair of end rings as being formed, from the mold together with the jig, and removing the jig from the laminated core and the reinforcing members.

When molten metal is poured, gas in the cavity is simultaneously discharged from the center opening of the end wall of the reinforcing member disposed at a side opposite to a gating system. Consequently, the flow of the molten metal is improved, and high-quality secondary conductors and end rings with few casting defects are formed. According to this method, it is not necessary to provide air vent holes in the reinforcing member disposed at an air-discharging side, whereby the strength thereof can be maintained.

BRIEF DESCRIPTION OF THE DRAWINGS

The foregoing and the other objects, features, and advantages of the present invention will be described in relation to the embodiments shown in the accompanying drawings, in which.

BEST MODE OF CARRYING OUT THE INVENTION

Figure 1:
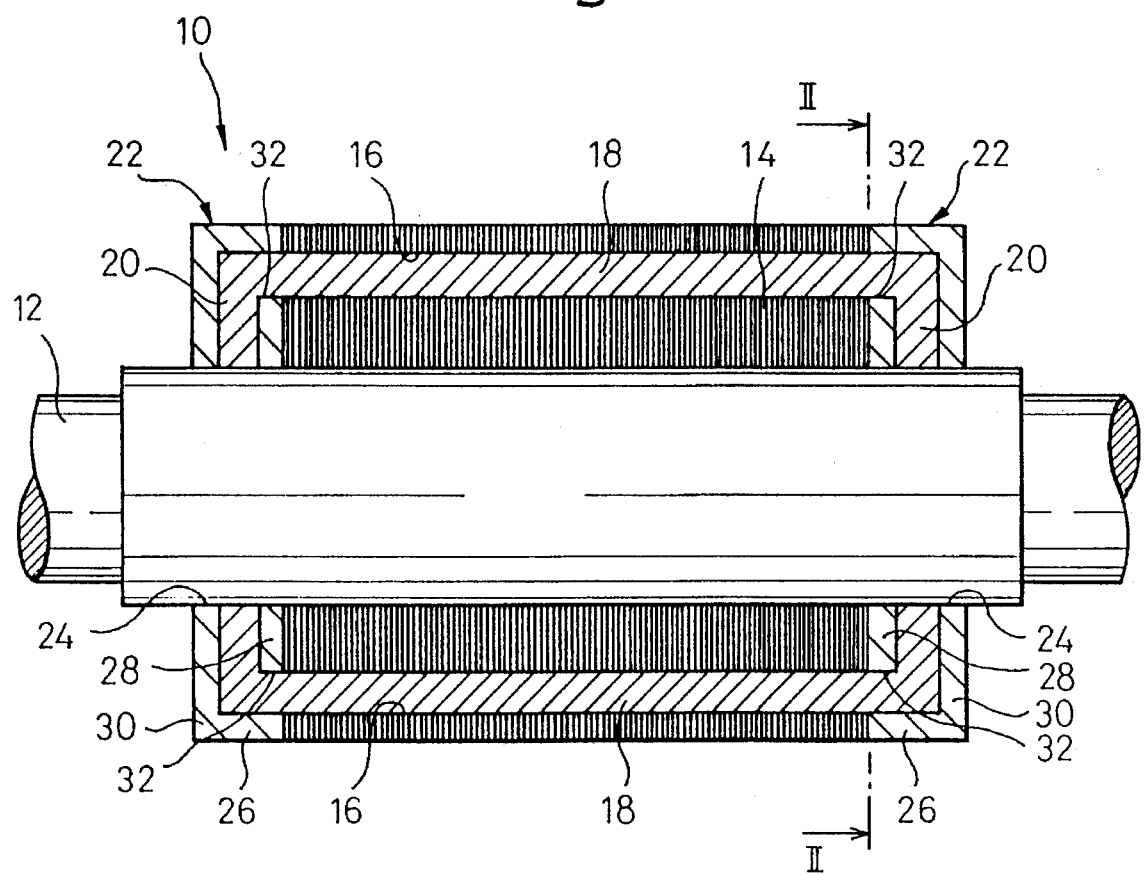
FIG. 1 is a sectional view of a squirrel-cage rotor produced by a method according to the present invention.

Referring to the drawings, FIG. 1 shows a squirrel-cage rotor 10 for a high-speed induction motor, which is produced by a method of the present invention. The squirrel-cage rotor 10 includes a shaft 12, a laminated core 14 made by stacking magnetic laminations such as silicon steel plates and fixed to the shaft 12, a plurality of secondary conductors 18 arranged respectively in a plurality of through holes 16 which are formed near the outer circumference of the laminated core 14 and axially penetrate through the core, a pair of end rings 20 arranged at both axial ends of the laminated core 14 and connecting the secondary conductors 18 to one another, and a pair of reinforcing members 22 respectively covering the end rings 20. The secondary conductors 18 and the end rings 20 are integrally formed through a casting process such as a die casting of aluminum, whereby the laminated core 14 and the reinforcing members 22 are integrally connected to each other. The secondary conductors 18 may be skewed relative to an axis, as is well known, to reduce a torque ripple when an electric motor operates.

Figure 2:
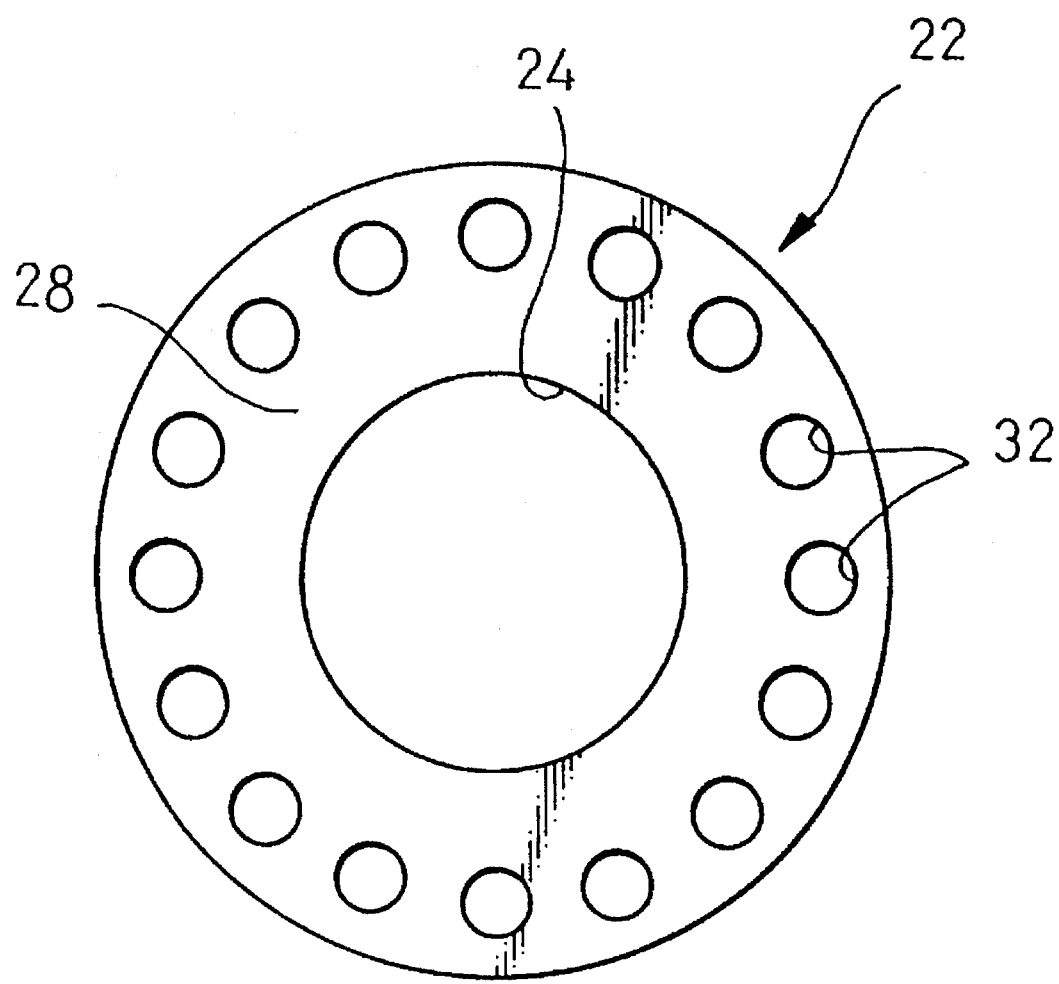
FIG. 2 is an end view of a reinforcing member of the squirrel-cage rotor of FIG. 1, shown along line II—II of FIG. 1.

The reinforcing members 22 are formed as annular elements, each of which has a generally U-shaped cross-section at a circumferential region and opens at an inner diameter portion 24 thereof in a radial inward direction. The reinforcing members are made from high-rigidity materials, such as iron or stainless steel, through, e.g., a machining process. Each of the reinforcing members 22 includes a cylindrical wall 26 having an outer diameter generally the same as that of the laminated core 14, and an annular multi-aperture wall 28 and an annular end wall 30, both extending in a radial inward direction from both the axial edges of the cylindrical wall 26. The multi-aperture wall 28 is provided with a plurality of apertures 32 (see FIG. 2) which can respectively communicate with the through holes 16 of the laminated core 14. When the end rings 20 are formed in the annular cavities defined by those walls through the casting process mentioned below, the cylindrical walls 26 of the reinforcing members 22 cover the radial outer circumferential surfaces of the end rings 20, the multi-aperture walls 28 are held between the axial end faces of the laminated core 14 and the end rings 20, and the end walls 30 are brought into contact with the axial outer end surfaces of the end rings 20. According to the present invention, reinforcing members 22 with identical shapes can be used, because it is unnecessary to provide an air vent in the reinforcing members for discharging air upon the casting process.

Figure 3:
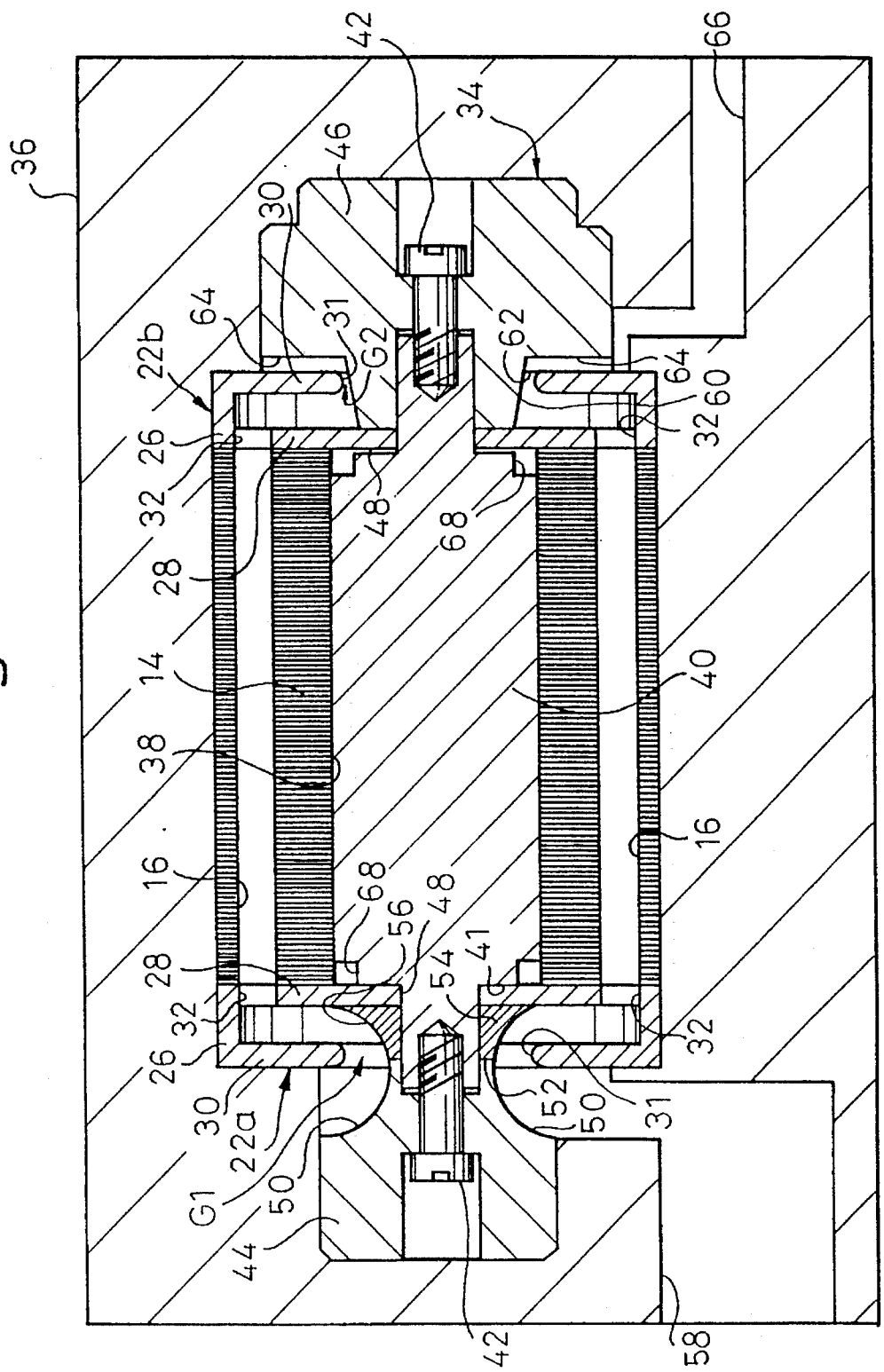
FIG. 3 is an illustration to show the method of producing the squirrel-cage rotor of FIG. 1, according to one embodiment of the present invention, which shows an unfinished squirrel-cage rotor together with a jig in a sectional view.

The method of producing the squirrel-cage rotor 10 having the above-mentioned structure is described as one embodiment of the present invention below with reference to FIG. 3. First, the reinforcing members 22 (indicated by 22a, 22b) are disposed coaxially to the laminated core 14 in a state where the multi-aperture walls 28 thereof are in contact with the axial end faces of the laminated core 14. At this time, the multi-aperture walls 28 are brought into contact with the end faces of the laminated core 14 in such a manner that the apertures 32 thereof are respectively communicated with the through holes 16 of the laminated core 14. In this state, the laminated core 14 and the reinforcing members 22a, 22b are fixed on a jig 34 shown in FIG. 3 and are located in a mold 36, and then the casting process is carried out.

The jig 34 includes a mandrel part 40 adapted to be inserted into a shaft bore 38 of the laminated core 14, and a pair of fastening parts 44, 46 joined to both axial ends of the mandrel part 40 through bolts 42 so as to integrally hold the laminated structure of the laminated core 14 and so as to hold the reinforcing members 22a, 22b into contact with the end faces of the laminated core 14. The multi-aperture walls 28 of the reinforcing members 22a, 22b are extended beyond the inner circumferential surface of the laminated core 14 in a radial inward direction, so as to make it possible for the jig 34 to hold the laminated core 14 between the reinforcing members 22a, 22b under desired pressure. These extended portions 48 are cut off after the casting process is completed, as mentioned below. According to the jig 34, the mandrel part 40 is first inserted into the shaft bore 38 of the laminated core 14, then the reinforcing members 22a, 22b are disposed in the above-mentioned manner at both axial ends of the laminated core 14, and after that the fastening parts 44, 46 are joined to the mandrel part 40.

One fastening part 44 includes a recess 50 extending annularly on the outer periphery thereof at a side opposite to the mandrel part 40. The distal end of the recess 50, i.e., a small diameter end 52 formed at one axial end of the fastening part 44 is generally coaxially arranged in a center opening 31 of the end wall 30 of the reinforcing member 22a, whereby an annular gap G1 is defined between the small diameter end 52 and the end wall 30. A spacer 54 is disposed between the small diameter end 52 of the fastening part 44 and the multi-aperture wall 28 of the reinforcing member 22a, and a predetermined pressure is applied by fastening the bolt 42 onto the multi-aperture wall 28 of the reinforcing member 22a from the fastening part 44 through the spacer 54. The spacer 54 has a curved face 56 adapted to be connected to the recess 50 of the fastening part 44, and the recess 50 of the fastening part 44 is connected to a gate 58 provided in the mold 36 so as to form a gating system. In this respect, it is preferred that the recess 50 and the curved face 56 have a desired curvature as illustrated to allow smooth flow of the molten metal. The spacer 54 can surely transfer the fastening force applied by the fastening part 44 to the laminated core 14 and the reinforcing member 22a, whereby the multi-aperture wall 28 of the reinforcing member 22a can be fixedly held between the spacer 54 and a shoulder 41 of the mandrel part 40. Also, the spacer 54 enables the fastening part 44 to be removed from the mandrel part 40 after the casting process.

Figure 4:
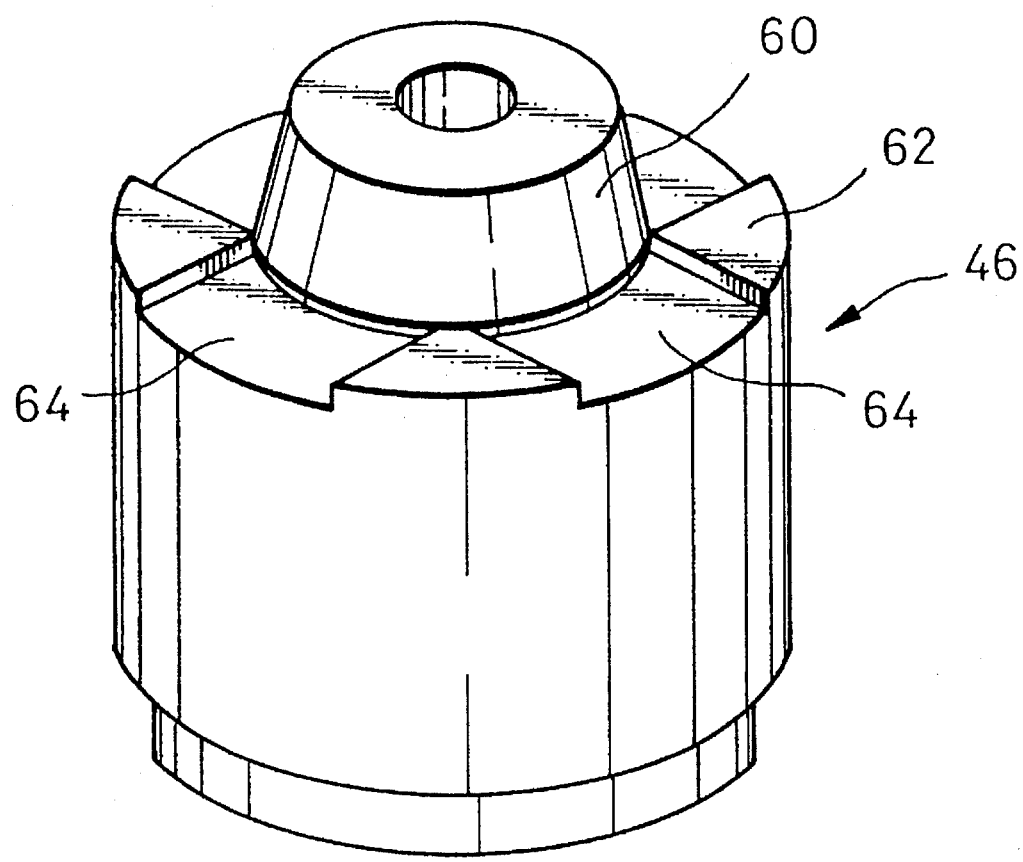
FIG. 4 is a perspective view of one component of the jig shown in FIG. 3.

Another fastening part 46 includes a small diameter portion 60 adapted to be generally coaxially inserted into a center opening 31 of the end wall 30 of the reinforcing member 22b, at a side opposite to the mandrel part 40. The outer diameter of the small diameter portion 60 is slightly smaller than the inner diameter of the center opening 31 of the reinforcing member 22b, whereby an annular small gap G2 is defined between the small diameter portion 60 and the center opening 31. The fastening part 46 is directly abutted at the one axial end thereof, i.e., the distal end of the small diameter portion 60, onto the multi-aperture wall 28 of the reinforcing member 22b. It is preferred that the small diameter portion 60 has a frusto-conical shape with a diameter tapered toward the mandrel part 40 in order to facilitate the removal of the fastening part 46 after casting. Further, as shown in FIG. 4, an annular shoulder 62 adjacent to the small diameter portion 60 of the fastening part 46 is provided with a plurality of grooves 64 extending in a radial direction. The fastening force caused by the fastening part 46 is directly applied onto the multi-aperture wall 28 and end wall 30 of the reinforcing member 22b through the shoulder 62 of the small diameter portion 60. The fastening part 46 cooperates with the fastening part 44 so as to integrally hold the laminated structure of the laminated core 14 and a pair of reinforcing members 22a, 22b. The grooves 64 provided on the shoulder 62 of the fastening part 46 define predetermined gaps between the fastening part and the end wall 30 of the reinforcing member 22b. These gaps are connected to an air discharging port 66 formed in the mold 36, and cooperate with the gaps G2 formed between the small diameter portion 60 and the end wall 30 at the center opening 31 of the reinforcing member 22b, so as to act as an air discharging passage in the casting process.

Molten metal, such as molten aluminum, is poured from the gate 58 through the center opening 31 of the end wall 30 of the reinforcing member 22a, toward the laminated core 14 and the reinforcing members 22a, 22b, which are fixedly supported by the jig 34 and located within the mold 36. The molten metal flows into the annular space of the reinforcing member 22a, then into the through holes 16 of the laminated core 14 through the apertures 32, and further into the annular space of the reinforcing member 22b through the apertures 32 thereof. In this respect, as mentioned above, air is discharged through the center opening 31 of the end wall 30 of the reinforcing member 22b and along the grooves 64 of the fastening part 46 of the jig 34, so that portions corresponding to the secondary conductors 18 and end rings 20 (FIG. 1) are integrally formed without causing any casting defects.

After the casting process, the fastening parts 44, 46 of the jig 34 are removed from the mandrel part 40, then the cast pieces (not shown) protruding inward from the inner circumferential surface of the laminated core 14 and the extended portions 48 of the multi-aperture walls 28 of the reinforcing members 22a, 22b are cut off by, e.g., a machining process, and after that, the mandrel part 40 is removed from the laminated core 14. In this respect, it is preferred to form depressions 68 at the peripheries of both end faces of the mandrel part 40, which are opposed to the multi-aperture walls 28 of the reinforcing members 22a, 22b, in order to prevent the tool for cutting off the extended portions of the multi-aperture walls 28 from contacting the mandrel part, to prevent any damage to the mandrel part 40, and it becomes possible to reuse the mandrel part. The laminated core 14 and the reinforcing members 22a, 22b, which are integrated in this manner through the casting process for the secondary conductors 18 and the end rings 20, are fixed onto the shaft 12 by, e.g., shrink fitting, whereby the rotor 10 shown in FIG. 1 is produced.

The present invention has been described in relation to the embodiment shown in the attached drawings, but is not restricted by the above descriptions, and various changes and modifications can be carried out without departing from the spirit and scope of the invention recited in the appended claims.

INDUSTRIAL APPLICABILITY

According to the present invention, in the casting process of a squirrel-cage rotor of an induction motor, gas can be smoothly discharged from casting cavities corresponding to secondary conductors and end rings when molten metal is poured into the casting cavities. Gas is discharged beyond the inner edge of the end wall of a reinforcing member, therefore it is not required to provide an air vent hole in the reinforcing member. Consequently, it is possible to cast high-quality secondary conductors and end rings without causing any casting defects, while maintaining the strength of the reinforcing member. Therefore, by using a squirrel-cage rotor produced by the present invention for a high-speed induction motor such as a spindle motor, the structural reliability of the motor can be improved.

We claim:

1. A method of producing a squirrel-cage rotor for an induction motor, which includes a laminated core coaxially fixed to a shaft and having axially extending through holes near an outer circumferential surface, a plurality of secondary conductors arranged respectively in the through holes of the laminated core, and a pair of end rings connecting the secondary conductors with one another at both axial ends of the laminated core, comprising the steps of:

a) providing a pair of reinforcing members, each of which includes an axially extending cylindrical wall having an outer diameter being generally the same as an outer diameter of said laminated core, an annular multi-aperture wall provided with apertures which can communicate respectively with said through holes of said laminated core and extending in a radial inward direction from one edge of said cylindrical wall, and an annular end wall spaced generally parallel to said multi-aperture wall and extending in a radial inward direction from another edge of said cylindrical wall;

b) arranging each reinforcing member in a manner in which said multi-aperture wall is brought into contact with one of axial end faces of said laminated core while said apertures communicate with said through holes, and, in this state, fixedly supporting said laminated core and said pair of reinforcing members by a jig;

c) placing said laminated core and said pair of reinforcing members supported by said jig in a mold;

d) pouring molten metal into a continuous cavity from a center opening of said end wall of one reinforcing member while discharging gas in said cavity from a center opening of said end wall of other reinforcing member, said cavity being defined in said mold by annular spaces each being surrounded by said cylindrical wall, said multi-aperture wall and said end wall of each reinforcing member, said apertures of said multi-aperture wall of each reinforcing member, and said through holes of said laminated core;

e) setting the molten metal in said cavity, whereby integrally forming said secondary conductors and said pair of end rings in a manner in which said multi-aperture wall of each reinforcing member is held between an axial end face of said laminated core and each end ring, and in which said cylindrical wall and said end wall of each reinforcing member cover a surface of each end ring; and f) removing said laminated core and said reinforcing members, which have said secondary conductors and said pair of end rings as being formed, from said mold together with said jig, and removing said jig from said laminated core and said reinforcing members.

2. A method as set forth in claim 1, wherein said multi-aperture wall of each reinforcing member has an extended portion extending beyond an inner circumferential surface of said laminated core in a radial inward direction, and wherein said step b) includes a step in which said jig is engaged with said extended portion so as to fixedly hold said laminated core and said pair of reinforcing members.

3. A method as set forth in claim 1, wherein said step d) includes a step in which the molten metal is poured from a gap defined between one part of said jig inserted into said center hole of said end wall of said one reinforcing member and said end wall, and the gas is discharged from a small gap defined between another part of said jig inserted into said center opening of said end wall of said other reinforcing member and said end wall.

4. A method as set forth in claim 1, wherein said step f) includes a step of removing surplus materials protruding from an inner circumferential surface of said laminated core in a radial inward direction.

* * * * *